(12) United States Patent
Mertins et al.

(10) Patent No.: US 6,583,754 B2
(45) Date of Patent: Jun. 24, 2003

(54) FAST FOURIER TRANSFORM SIGNAL PROCESSING METHOD FOR DOPPLER RADAR SPEED SENSOR

(75) Inventors: Karl-Heinz O. Mertins, Davenport, IA (US); Jerry Dean Littke, Hillsboro, ND (US); William Flavis Cooper, Fargo, ND (US); Rick Allen Worrel, McKinney, TX (US)

(73) Assignee: Deere & Company, Moline, IL (US)

( * ) Notice: Subject to any disclaimer, the term of this patent is extended or adjusted under 35 U.S.C. 154(b) by 0 days.

(21) Appl. No.: 09/984,821

(22) Filed: Oct. 31, 2001

(65) Prior Publication Data

US 2003/0080895 A1 May 1, 2003

(51) Int. Cl.[7] ............................................. G01S 13/08
(52) U.S. Cl. ..................... 342/104; 342/70; 342/194; 342/195; 342/196; 340/429; 340/444
(58) Field of Search ................................. 342/104, 105, 342/83, 192–196, 200, 70–72, 84, 106, 114; 340/429, 444, 463, 466, 467, 933, 936

(56) References Cited

U.S. PATENT DOCUMENTS

| | | | | |
|---|---|---|---|---|
| 5,302,956 A | * | 4/1994 | Asbury et al. | 342/196 |
| 5,430,450 A | | 7/1995 | Holmes | 342/69 |
| 5,517,196 A | * | 5/1996 | Pakett et al. | 342/70 |
| 5,625,362 A | | 4/1997 | Richardson | 342/70 |
| 5,638,305 A | * | 6/1997 | Kobayashi et al. | 700/280 |
| 5,731,778 A | | 3/1998 | Nakatani et al. | 342/70 |
| 5,761,383 A | * | 6/1998 | Engel et al. | 706/4 |
| 6,014,595 A | * | 1/2000 | Kobayashi | 701/1 |
| 6,091,355 A | * | 7/2000 | Cadotte et al. | 342/104 |
| 6,097,669 A | * | 8/2000 | Jordan et al. | 367/99 |
| 6,101,882 A | * | 8/2000 | Tran et al. | 73/662 |
| 6,369,700 B1 | * | 4/2002 | Yamada | 180/169 |
| 6,415,133 B1 | * | 7/2002 | Brede et al. | 455/3.05 |

OTHER PUBLICATIONS

Ashruf S. El–Dinary et al., Non–Recursive FM Demodulation Of Laser Radar Backscatter Using Time–Frequency Distributions, Space Department, IEEE 1994, pp. 353–356.*
Brochure, "The Finite Fourier Transform"; Jun. 1969, pp. 251–259.

* cited by examiner

Primary Examiner—Thomas H. Tarcza
Assistant Examiner—Isam Alsomiri

(57) ABSTRACT

A vehicle speed sensing system includes an RF transceiver coupled to an antenna for transmitting an RF signal towards the terrain over which the vehicle moves and for receiving a reflected Doppler signal therefrom. The transceiver generates a time-domain in-phase reference signal I and a time-domain quadrature signal Q which is offset in phase by 90 degrees from the reference signal I. A digital signal processor which receives the I and Q signals, and uses a complex fast Fourier transform routine to convert the time domain I and Q signals to frequency domain values I(f) and Q(f). The digital signal processor further processes the I(f) and Q(f) values and generates a speed a direction signal which is unaffected by vehicle vibrations.

3 Claims, 4 Drawing Sheets

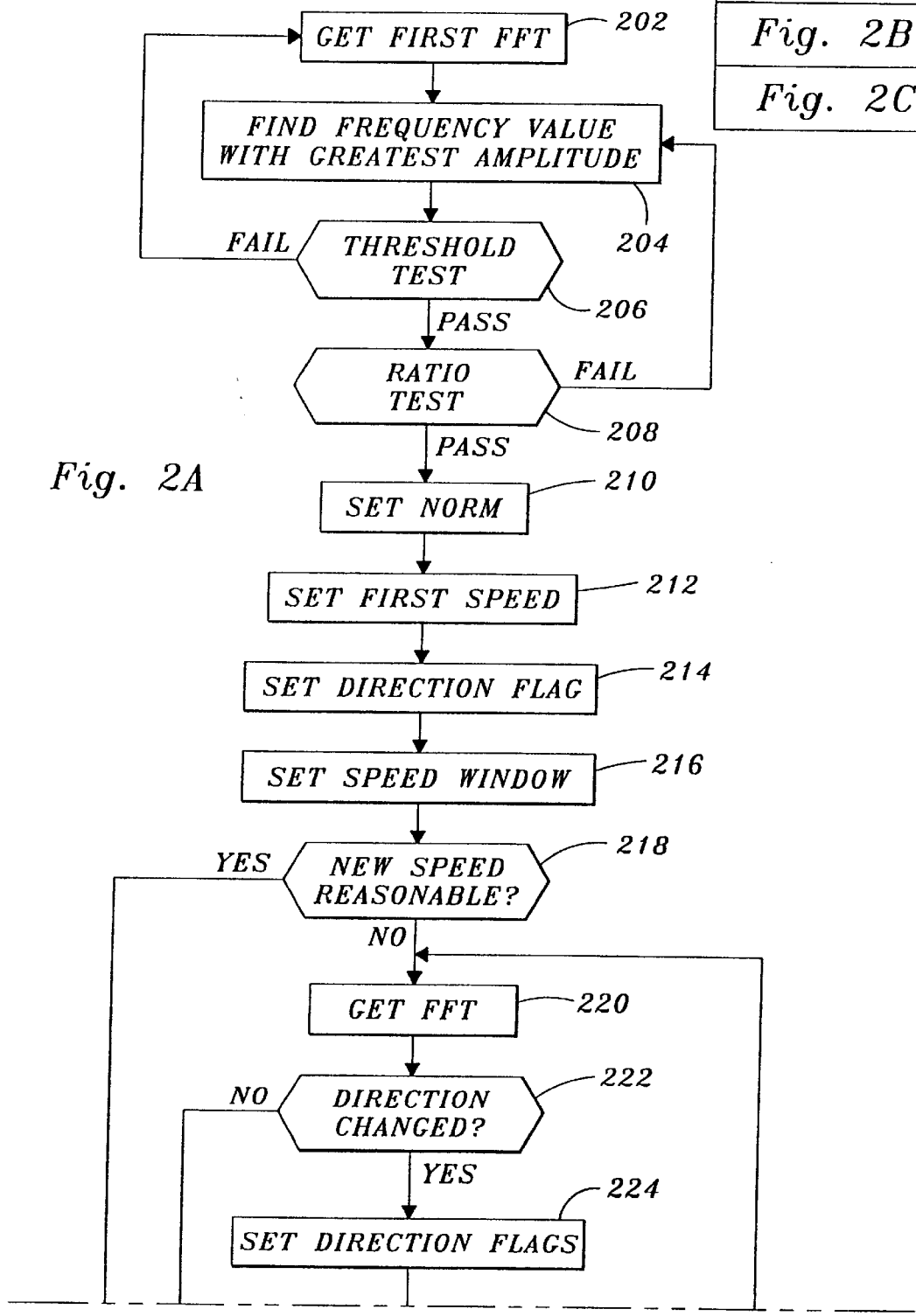

FAST FOURIER TRANSFORM SIGNAL PROCESSING METHOD FOR DOPPLER RADAR SPEED SENSOR

BACKGROUND OF THE INVENTION

The present invention relates to a signal processing method for Doppler Effect radar speed sensor.

Current vehicle radar speed sensors, such as those used on agricultural tractors, are susceptible to vibration and thus indicate vehicle movement even when the vehicle is standing still. Commercially available vehicle mounted Doppler radar speed sensing units detect motion and generate a speed signal. Such units can generate an inaccurate speed signal when subjected to vibration of the vehicle or when parked in view of waving grass, paper etc. Software filters have been used to attempt to determine if the detected motion is due to actual vehicle speed or to some artifact. Such filters act to slow down the response of sensor. Another method used to overcome this problem is to have two radar units (two antennas, two detectors) mounted such that they view the ground in different directions (the so-called "Janus" configuration). A signal processing system receives the signals from both radar units and determine whether or not the vehicle is actually moving.

SUMMARY

Accordingly, an object of this invention is to provide a radar speed sensing system which provides accurate speed information in spite of vehicle vibrations.

A further object of the invention is to provide such a radar speed sensing system which provides both speed and direction information.

A further object of the invention is to provide such a radar speed sensing system which does not require a slow performing software filter.

A further object of the invention is to provide such a radar speed sensing system which does not require two antennas and two detectors.

These and other objects are achieved by the present invention, wherein a radar speed sensing system includes a microwave transceiver which has two detectors arranged so that they generate a pair of Doppler shifted signals which are 90 degrees out of phase with each other. A digital signal processor (DSP) processes the received Doppler signals. The DSP executes a complex fast Fourier transform (FFT) routine which allows both the direction and speed of the sensor to be determined simultaneously. Direction is sensed by determining if the phase on the first Doppler signal lags 90 degrees behind or leads 90 degrees ahead, of the other Doppler signal. With the DSP running an FFT routine, speed is determined in the frequency domain, instead of the time domain. Determining speed in the frequency domain results in a system which is better able to distinguish noise from an actual Doppler signal. The complex FFT can identify frequencies caused by vehicle vibration, which can then be ignored or discounted. By determining vibration frequencies, this system is able to avoid indicating vehicle movement when the vehicle is standing still.

BRIEF DESCRIPTION OF THE DRAWINGS

FIGS. 2A–2C form a logic flow diagram illustrating an algorithm executed by the digital signal processor of FIG. 1.

DETAILED DESCRIPTION

Figure 1:
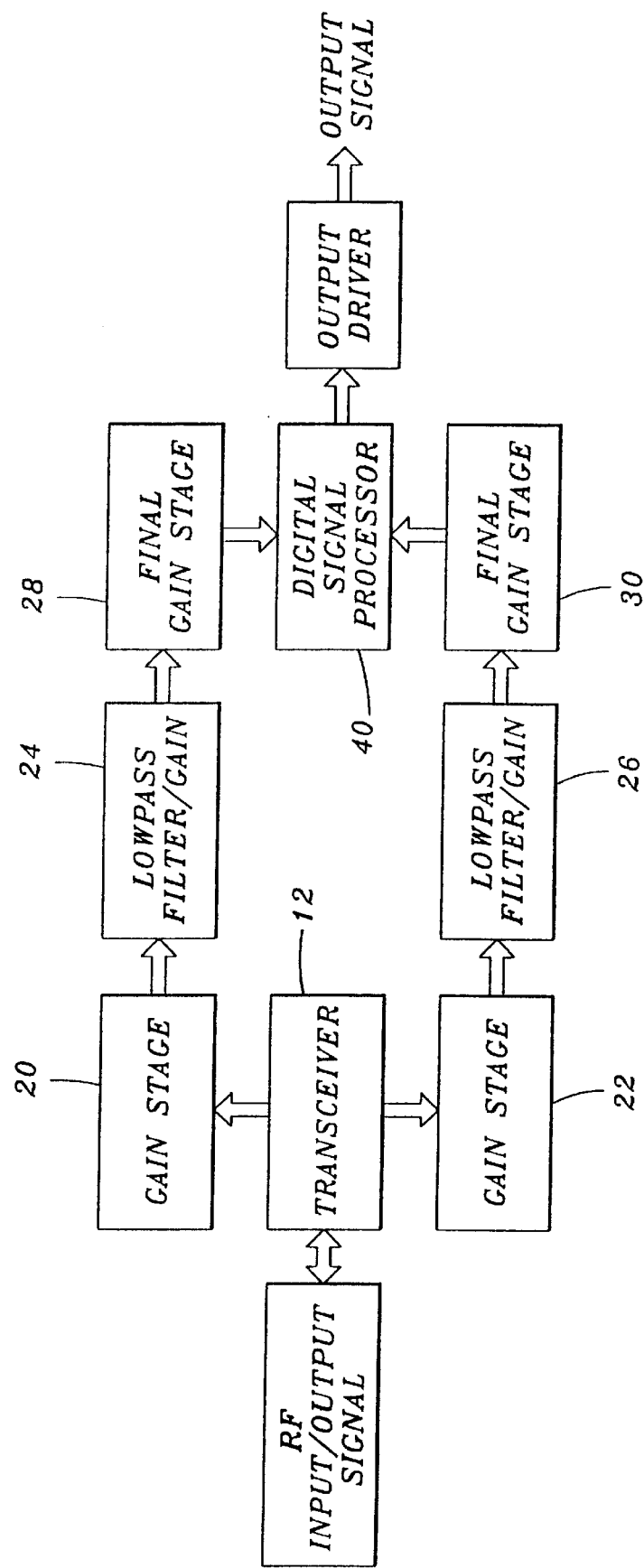
FIG. 1 is a simplified schematic block diagram of a speed sensing system according to the present invention.

Referring to FIG. 1, the vehicle speed sensing system 10 includes a microwave transceiver 12 coupled to an antenna 13. The antenna 13 preferably transmits continuous wave microwave signal at a desired frequency, such as at 24.125 Gigahertz towards the terrain over which the vehicle (not shown) travels, and receives a reflected Doppler signal therefrom. The transceiver 12 has two detectors (not shown), such as Schottky diodes. Each detector functions as a microwave mixer forming two channels. One of the detectors is considered a phase reference and generates the in-phase reference signal I. The second detector generates the quadrature signal "Q" which is offset in phase by approximately 90 degrees from the reference signal I.

The time domain Doppler signals I and Q are processed via corresponding gain stage units 20, 22, low pass filter/gain units 24, 26 and final gain stage units 28, 30, and transmitted to a digital signal processor, DSP, 40.

Figure 2B:
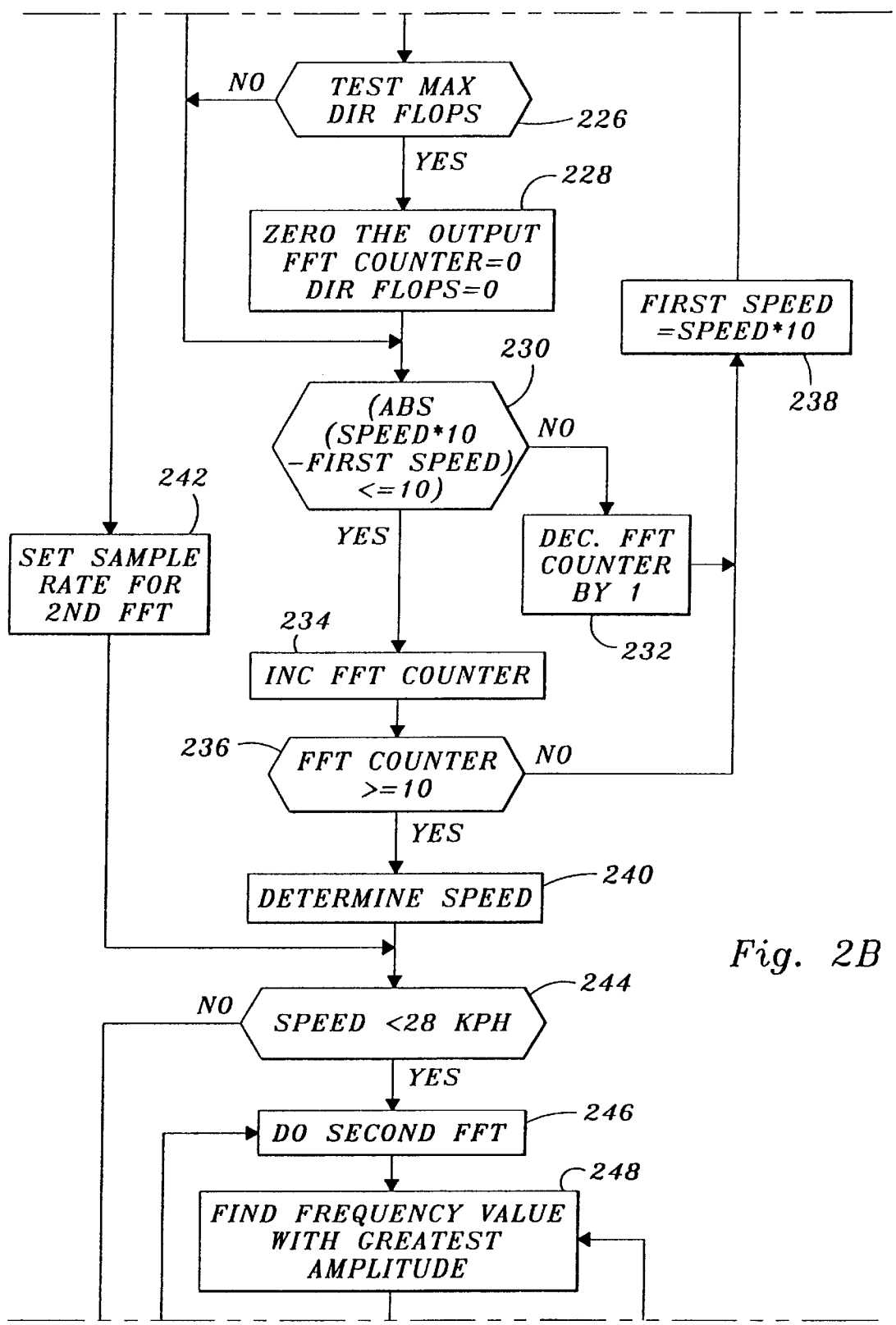
Figure 2C:
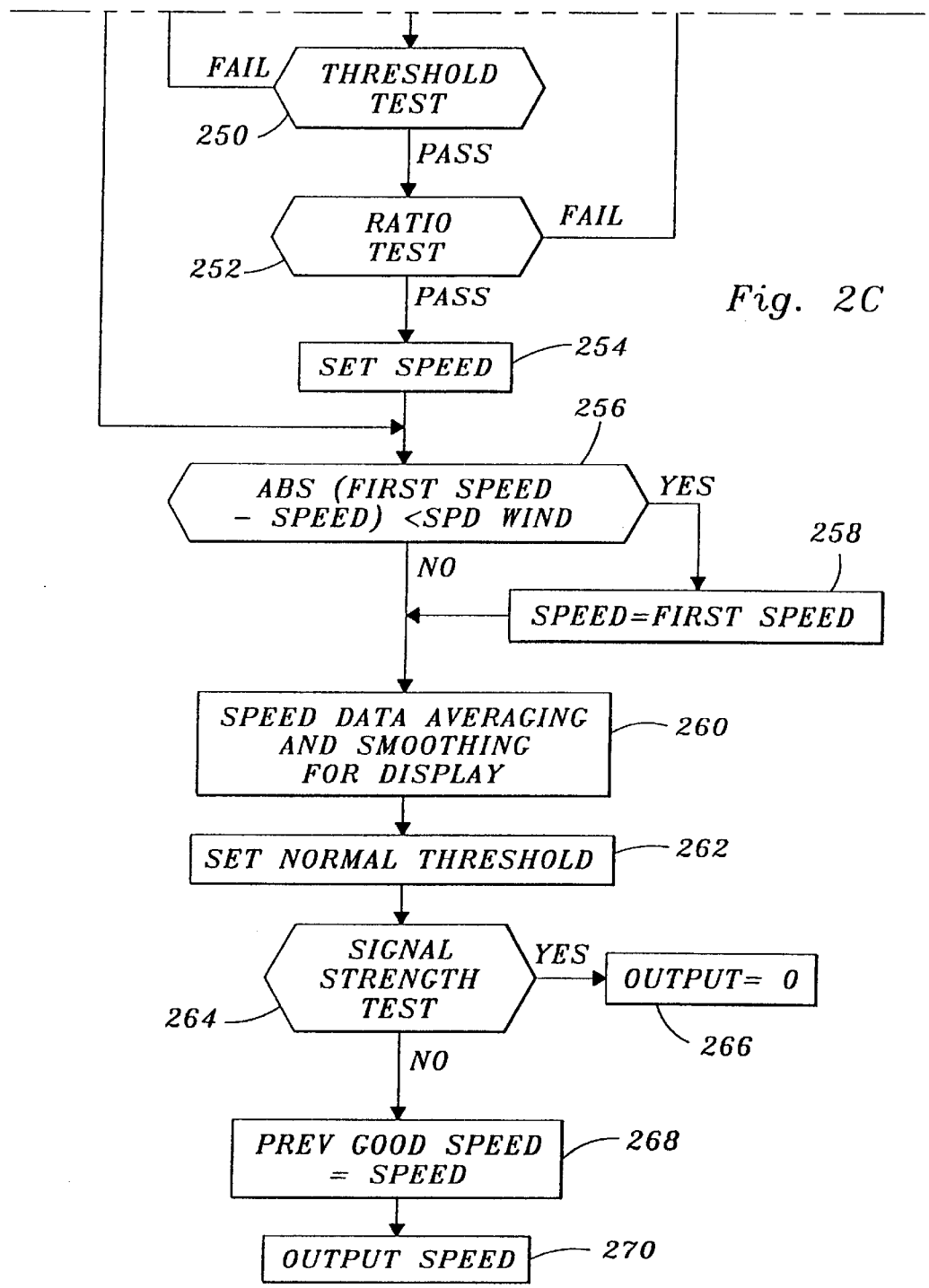

The DSP 40 executes a signal processing algorithm 200 which is illustrated by the flow chart shown in FIGS. 2A–2C. The following description applies to the situation where the vehicle starts up or accelerates from zero speed or rest condition.

Step 202 obtain a number (128 for example) of FFT samples of the signals I and Q, and converts the time domain I and Q signals to 128 frequency domain values I(f) and Q(f) using a complex fast Fourier transform (FFT) routine which is preferably similar to the FFT routine described in Texas Instruments Technical Document "Digital Signal Processing Applications for the TMS320 Family; Theory, Algorithms, and Implementations". Passing the quadrature outputs I and Q through an FFT routine decodes the speed and direction of motion of the transceiver 12. The quadrature outputs I and Q are Doppler shifted signals from 0 to approximately 2400 Hz. Their phase relationship indicates the direction of motion of the transceiver. The two signals I and Q are always 90 degrees out of phase. Signal I leading signal Q indicates motion in one direction while Q leading I indicates motion in the opposite direction.

Thus, there are obtained and stored 128 frequency domain values, including 64 forward frequency domain values and 64 reverse frequency domain values, each with a corresponding amplitude component, stored in 128 memory locations or "bins" in a memory of the DSP 40. These 128 "bins" include (0 through 63) possible first or forward frequency domain values, corresponding to speeds 0 kph to maximum speed, respectively in the forward direction, with a low resolution of 1 kph. These 128 "bins" also include (127 through 63) possible second or reverse frequency domain values, corresponding to speeds 0 kph to maximum speed, respectively in the reverse direction, also with a low resolution of approximately 1 kph. Thus, each frequency domain value represents a speed equal to and opposite from its corresponding mirror image frequency domain value.

Step 204 searches the reverse and forward frequency domain values for the frequency domain value which has the highest amplitude component starting from highest to lowest frequency (or speed) values, or the next highest amplitude component starting from highest to lowest frequency values upon subsequent executions of step 204.

Step 206 compares the amplitude of the frequency domain value found in step 204 with a fixed threshold. If the amplitude is greater than the threshold the algorithm proceeds to step 208. Otherwise, this FFT data is not used and the algorithm returns to step 202 to get another FFT sample.

Step 208 calculates the ratio of the amplitude of the frequency domain value (corresponding to vehicle movement in one direction) found in step 204 with the amplitude of its mirror image frequency domain value corresponding to vehicle movement in the opposite direction. If the ratio of the two signal amplitudes is greater than a fixed value, the algorithm proceeds to step 210. Otherwise, the algorithm goes back to step 204 to find the frequency value with the next highest amplitude component. Thus, steps 204–208 perform a ratio test which operates on the amplitudes of the frequencies to distinguish frequencies which result from noise or vehicle vibration from valid Doppler frequencies. Steps 204–208 identify frequency values which fail the ratio test as being frequencies caused by vehicle vibration, and causes those frequency values to be ignored or discounted and not used in the generation of an output speed.

Based on the amplitude components of the frequency domain values, step 210 sets a signal strength parameter, NORM, which is a number inversely proportional to signal strength in decibels.

Step 212 sets a first_speed value based on the largest amplitude frequency domain value which passes the tests implemented by steps 206–208.

Step 214 sets a direction flag equal to forward or reverse based on the direction found for the first_speed value, which depends upon whether the largest amplitude frequency domain value was a forward or reverse frequency domain value.

Step 216 determines what a reasonable change in speed would be. That is, based on the current speed, step 216 determines an expected range of a new speed.

Step 218 compares the new or current speed with the previous speed and determines if the new speed is reasonable, based on what was determined in 208. If yes, the algorithm proceeds to step 242. If not, the algorithm proceeds to step 220.

Steps 220–240 function when the new speed is not reasonable relative to the current speed and operates to filter out extraneous causes, such as blowing grass movements.

Step 220 is a repeat of step 202.

Step 222 checks if the direction has changed. If it has, the algorithm proceeds to step 224, otherwise go to step 230.

Step 224 stores a current direction flag.

Step 226 checks if the direction flag has changed more than a fixed number of times. If it has not changed that number of times, the algorithm proceeds to step 230, otherwise to step 228.

Step 228 clear some counters and report an output speed of zero.

Steps 230–238 operate to repeat the collection of data until a set number of good readings have been calculated. When this number is met, a speed value is set to the calculated value and the algorithm proceeds to step 244.

Step 242 determines a high accuracy or high resolution speed value. Accuracy is a function of speed, and the slower the speed the higher the accuracy. The first speed determination done in 204–212 is a low accuracy (resolution) determination.

In step 244, if the first speed determined was higher than 28 kph, it already has the highest resolution possible, and the algorithm proceeds to step 256.

Step 246 obtains and stores 128 sensor readings and convert from time domain signal to forward and reverse frequency domain values with corresponding amplitudes, similar to step 202, but with a higher resolution which is a function of the sample rate determined in step 242.

Step 248 searches the reverse and forward frequency domain values stored in step 246 for the value with the highest amplitude component starting from highest to lowest frequency (or speed) values, or, on subsequent executions, the next highest amplitude component starting from highest to lowest frequency (or speed) values.

Step 250 compares the amplitude component of the frequency value found in step 248 with a fixed threshold. If the amplitude is greater than the threshold, the algorithm proceeds to the step 252. Otherwise, this FFT data is not used and the algorithm returns to step 246 to obtain and store another FFT sample.

Step 252 calculates the ratio of the amplitude component of the frequency value found in step 248 with the amplitude of its mirror image in the set of opposite direction frequency values. If the ratio of the two amplitudes is greater than a fixed value, the algorithm proceeds to step 254. Otherwise, the algorithm returns to step 248 to find the frequency value with the next highest amplitude. Thus, like steps 204–208, steps 248–252 also perform a ratio test of the amplitudes of the frequency values which operates to distinguish frequencies which result from noise or vehicle vibration from valid Doppler frequencies. Steps 248–252 identify frequencies which fail the ratio test as being frequencies caused by vehicle vibration, and cause those frequencies to be ignored or discounted.

Step 254 sets a speed value corresponding to the stored forward or reverse frequency value having the highest corresponding amplitude and meeting the threshold and ratio conditions of steps 250 and 252.

Steps 256–258 operate such that, if a difference in the current and the previous speed values is greater than a fixed amount, then the speed value is set to equal to the previous speed value determined by a previous execution of step 254.

Step 260 perform averaging/data smoothing functions on the speed values to condition them for display on a operator display (not shown).

Step 262 sets an adaptive threshold "Norm-thr". The value for norm threshold will be set to a lower value when the previous good speed is zero (indicating that the vehicle is stopped) and set to a different higher value for when the previous good speed value is greater than zero (indicating that the vehicle is moving).

Step 264 uses the NORM value from step 218 and the norm threshold value from step 262 and performs a signal strength test, so that steps 262 and 264 operate together to prevent engine vibrations from causing false speed values when the vehicle is stopped. If the signal strength is too weak, the test is failed and step 266 outputs a zero vehicle speed value. If the signal strength is strong enough, step 268 updates the previous speed value to the current average speed value as determined in step 260, and step 270 outputs the current speed value. This output speed value may be a zero speed value, or it will be a speed and direction value which corresponds to the stored forward or reverse frequency value having the largest amplitude and which satisfies the other conditions implement by this algorithm 100.

As a result, this system determines both the direction and speed of the sensor or the vehicle on which it is mounted. Direction is determined depending upon whether the phase on the first Doppler signal lags 90 degrees behind or leads 90 degrees ahead, of the other Doppler signal. With the DSP 40 running the FFT routine, speed is determined in the frequency domain, instead of the time domain. Determining speed in the frequency domain results in a system which is better able to distinguish noise from an actual Doppler signal. The complex FFT routine, substantially as a result of steps 204–208 and 248–252, can identify frequencies caused by vehicle vibration as being those frequencies which fail the amplitude ratio test therein, which frequencies can then be ignored or discounted. This ability to ignore vibration-induced frequencies is an improvement over current agricultural radars which are susceptible to vibration and thus can indicate vehicle movement even when the vehicle is standing still.

The conversion of this flow chart into a standard language for implementing the algorithm described by the flow chart in a digital computer or microprocessor, will be evident to one with ordinary skill in the art.

While the present invention has been described in conjunction with a specific embodiment, it is understood that many alternatives, modifications and variations will be apparent to those skilled in the art in light of the foregoing description. Accordingly, this invention is intended to embrace all such alternatives, modifications and variations which fall within the spirit and scope of the appended claims.

We claim:

1. A signal processing method for a vehicle speed sensing system having an RF transceiver coupled to an antenna for transmitting an RF signal towards the terrain over which the vehicle moves and for receiving a reflected Doppler signal therefrom, the transceiver generating a time-domain in-phase reference signal I and a time-domain quadrature signal Q which is offset in phase by 90 degrees from the reference signal I, and a digital signal processor which receives the I and Q signals, the signal processing method comprising:

executing a complex fast Fourier transform routine to convert the time domain I and Q signals to frequency domain values I(f) and Q(f);

converting the frequency domain values I(f) and Q(f) to a vehicle speed signal;

identifying vibration domain frequency values resulting from vehicle vibration; and preventing such vibration frequency domain values from effecting the conversion of the frequency domain values I(f) and Q(f) to the vehicle speed signal.

2. The signal processing method of claim 1, further comprising:

obtaining and storing reverse and forward frequency domain values with corresponding amplitude values, each forward frequency domain value representing a forward vehicle speed, each reverse frequency domain value representing a reverse vehicle speed, and each reverse domain frequency value having a corresponding mirror image forward frequency domain value representing an equal and opposite vehicle speed; and calculating the ratio of an amplitude of a frequency domain value to an amplitude of a corresponding mirror image frequency domain value; and if said ratio is less than a threshold, preventing such frequency domain value from being converted to the vehicle speed value.

3. The signal processing method of claim 2, wherein:

each reverse frequency domain value represents a speed equal to and opposite from its corresponding mirror image forward frequency domain value.

* * * * *